United States Patent
Kraft et al.

[11] Patent Number: 6,088,136
[45] Date of Patent: *Jul. 11, 2000

[54] METHOD FOR PRODUCING INDEX PRINTS

[75] Inventors: Walter Kraft, Zürich; Karl Ursprung, Oberhasli, both of Switzerland

[73] Assignee: Gretag Imaging AG, Regensdorf, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,955

[22] Filed: Aug. 11, 1997

[30] Foreign Application Priority Data

Aug. 29, 1996 [EP] European Pat. Off. ............. 96810569

[51] Int. Cl.$^7$ .................................................. H04N 1/46
[52] U.S. Cl. .......................................... 358/506; 358/525
[58] Field of Search ..................... 358/500, 506, 358/513, 514, 515, 521, 522, 523, 525, 527

[56] References Cited

U.S. PATENT DOCUMENTS

| | | | |
|---|---|---|---|
| 4,903,068 | 2/1990 | Shiota | 355/20 |
| 4,933,773 | 6/1990 | Shiota et al. | 358/302 |
| 5,184,227 | 2/1993 | Foley | 358/302 |
| 5,315,346 | 5/1994 | Graebe et al. | 355/1 |
| 5,400,152 | 3/1995 | Manico et al. | 358/501 |
| 5,568,269 | 10/1996 | Jamzadeh | 358/298 |

FOREIGN PATENT DOCUMENTS

| | | | |
|---|---|---|---|
| 0 360 751A1 | 9/1988 | European Pat. Off. | |
| 0 475 897A1 | 9/1991 | European Pat. Off. | |
| 0 586 773A1 | 9/1992 | European Pat. Off. | |
| 0 697 628A1 | 8/1994 | European Pat. Off. | G03D 15/00 |
| 63-13571 | 4/1988 | Japan | H04N 1/40 |

*Primary Examiner*—Jerome Grant, II
*Attorney, Agent, or Firm*—Burns, Doane, Swecker & Mathis, LLP

[57] ABSTRACT

In a method for producing index prints from photographic originals, each of the photographic originals is photoelectrically scanned in a scanning station of a photographic printer by a color- sensitive scanning system of low to medium local resolution in a plurality of first scanning regions. Using the scanning data, a digital color data set is determined for each original, with the aid of which set a digital representation of the picture content of the original is prepared for each original. The individual digital representations are grouped into a digital composite picture, from which an index print can be produced by an output device. The originals are also photoelectrically scanned in a scanning station by a locally high-resolution density scanner in a plurality of second scanning regions. From the scanning data of the density scanner, a digital density data set for each original is determined, which includes density data representative of the original and which has a higher local resolution than the color data set. In producing the digital representation of the picture content of the respective photographic original, both the associated color data set and the associated density data set are used.

16 Claims, 3 Drawing Sheets

METHOD FOR PRODUCING INDEX PRINTS

BACKGROUND OF THE INVENTION

1. Field of the Invention

The invention relates to a method for producing index prints having a selectable number of small positive images of associated photographic originals.

2. State of the Art

When customers turn in exposed film material for processing, the exposed film material is typically developed in the photo laboratory in order to obtain photographic originals, from which photographic copies or prints are then made by a photographic printer. Very often in the industry, the film material is negative films which are developed in the photo laboratory. In that case, the photographic originals are the individual frames on the developed negative film strips, and the photographic copies produced from them are paper prints. Hereinafter, for the sake of simplicity, this situation will be referred to by way of example; that is, the frames located on the negative films will be taken as a representative example of photographic originals, and the paper prints as a representative example of photographic copies. Naturally slides, for example, can also serve as originals from which copies are made, and photographic copies can be in the form of sheets.

Once a customer order has been processed, the customer typically receives the developed negative films in the form of strips of film that each contain from 4 to 6 frames, for instance, together with the paper prints. The customer often then keeps the negative film strips in a separate place from the paper prints. For instance, the paper prints are arranged in a photo album, and the negative film strips are collected at a separate location. If the client later wants to order reprints, it is often quite difficult, especially for an amateur photographer, to identify the desired image on the negative film strips. Especially with color negative film, it is very difficult for an unskilled person to assess the picture content of frames on the negative film strips, because of the color reversal and the film mask. So-called index prints make this task much easier. An index print is a single paper copy, for instance of the same size as a paper print, but that contains a plurality of small single images that belong to different frames on the negative film and are shown in the form of small positive images.

By way of example, all the frames on a negative film can be shown on such an index print, in the form of a matrix of individual small positive images. Besides the individual pictures, the index print typically also contains other information. For instance, for each individual picture it can be noted what the number of the associated frame on the negative film is. Other individual frame information, generated individually during the production of the index print or located on the negative film and read off from it, can also be included. The index print can also contain order-specific data, such as the film identification number, as well as a company logo, such variable information as the date, and so forth.

For the customer, the index print meets a practical need, because he can find out what a negative film contains from the small positive images without having to look at the film itself or touch it. The difficulties in assessing the negative film because of the color reversal are thus circumvented. Index prints are also highly advantageous for ordering reprints. On one hand, the customer can easily identify the desired frame, without making mistakes, from the small positive images with the associated negative numbers. On the other, he no longer has to hold the negative strips in his hand, thus markedly reducing the danger of damage to the negative film strip, from scratches, dirt, dust or fingerprints, that are deleterious to the quality of paper reprints.

The index print is thus a kind of "table of contents" of a photo album and is especially advantageous and customer-friendly for ordering reprints. For the future, and also in view of recent developments in the field of photographic materials and the increasing significance of video technology (such as photo CDs), it can therefore be expected that index prints will gain markedly greater significance and will become standard in photoprocessing. Hence there is a strong need for photographic printers, with which photographic copies of photographic originals are produced, also to be capable either of producing such index prints directly or of furnishing the necessary data in digital form for an external device.

Currently known technologies for producing index prints can be roughly divided into two categories. The first category includes methods in which the index prints are produced in purely optical photographic ways. The frames on the negative film are copied by optical projection, on either a natural or a reduced scale, onto photographic paper, or photo paper for short. The individual images in the matrix of the index print are projected in sequence, directly from the originals on the negative film, purely photographically onto photo paper using a special lens. In principle—aside from the different scale of enlargement and the matrixlike arrangement of individual pictures—there are hardly any differences from the classical mode of operation of a photographic printer. This purely photographic technology has been described for instance in European Patent Disclosure EP-A 0 697 628. Although the method proposed in this reference is in principle absolutely functional and powerful, it does have limitations. For instance, the index print must be produced using a photographic printer and cannot be produced by some other output device.

In the second category, the technology is markedly different. Here, the original (frame) is first broken down by an optical scanner into a large number of individual pixels, which in turn are split up into three colors, represented as digital numerical values, and stored in memory. From the thus-stored picture contents of a number of successive frames of a negative film strip, small images combined into an index print are then produced using a color printer or picture output device of suitable design (CRT printer, thermal printer, laser printer, or the like). Examples of this technology are found in U.S. Pat. Nos. 4,903,068, 4,933, 773, 5,184,227 and 5,400,152.

In U.S. Pat. No. 4,903,068 for producing a photographic copy (image frame), the original is exposed regionally in the exposure station of the photographic printer with an unmodulated light spot of a black-white cathode ray tube (CRT) and transmitted onto photo paper in color sequence via a projection lens and three color filters. During this process, some of the light of the light spot, once it has passed through the original and before it reaches the projecting lens, is deflected to a photoreceiver by a partly reflective mirror. The image signals thus produced are digitized and stored in memory for each frame of the negative film in the form of a data set, with three color density values per pixel. After a selectable, predetermined number of copied frames at a time, the stored image signals are called up from the memory and electronically processed into a composite picture with a corresponding number of reduced-size pictures. This composite picture is shown, as a negative black and white image for each component color, on the same cathode ray tube by which the photographic copies were produced, and its image light can thus be projected as an index print onto the photo paper.

A similar method is disclosed in U.S. Pat. No. 4,933,773. Here, however, a conventional halogen incandescent lamp serves as a light source for projecting the original onto photo paper. The difference and the advantage over U.S. Pat. No. 4,903,068 is that all the pixels are transmitted simultaneously, thus shortening the exposure time required. To produce the index print when the image light of an original is projected, some of the copying light, after passing through the original, is reflected out to a video camera. The video camera receives the picture information, divides it up by color, encodes it digitally, and stores it in memory. Once the predetermined number of frames have been projected, the associated digitally stored picture information is called up in diluted form and grouped into a matrix, and a negative index print is produced. This is shown on a cathode ray tube and is transferred to the photo paper using a set of color filters and a swiveling mirror in the projection beam path of the printer.

The index print is produced and the requisite digital data is obtained in the exposure station of the photographic printer in both of these methods. A disadvantage of these methods is that they require significant extra expenditure for devices (high-resolution video camera, deflecting mirror, and so forth) in the exposure station of the printer, which is relatively expensive. Correct exposure control for producing the prints is also more difficult, because an unknown portion of the copying light intensity is deflected away from the exposure beam path.

Currently, photographic printers for producing photographic prints normally do not use standardized, uniform amounts of copying light. Rather, exposure control processes are employed, in which the most optimal possible amounts of copying light and in particular the exposure times for the three fundamental colors of blue, green and red are determined for the individual frames. To that end, in a scanning station preceding the exposure station of the printer, the individual frames of the negative films are analyzed by being photoelectrically scanned regionally using measurement light. The measurement light transmitted or remitted from each scanning region is delivered to a detector array, broken down spectrally, and converted into wavelength-and intensity-dependent electrical measurement signals. The electrical measurement signals are then digitized and utilized for ascertaining the amounts of copying light required.

U.S. Pat. Nos. 5,184,227 and 5,400,152 suggest that the scanning data, as determined by analyzing the originals in the scanning station of a printer using a locally high-resolution color scanner, be used to generate digital representations of the picture contents of the individual frames, and that the index prints be produced using these digital representations. To that end, the originals are scanned in the scanning station by the locally high-resolution color scanner, which for each scanning region measures the color densities in the three fundamental colors of red, green and blue. These scanning data per original are then used in their entirety to generate the digital representation of the picture content of this original. To ensure that the index prints will be of adequate quality and will give a good optical impression of the picture content, a high number of scanning regions is used. In U.S. Pat. No. 5,184,227, for instance, it is stated that each original is scanned with a resolution of 480 (vertical)× 252 (horizontal) scanning regions; that is, the original is assessed with respect to its color density in the colors of blue, green and red, in 120,960 scanning regions, arranged in the form of a 480×252 matrix. Although such high resolution is certainly advantageous with a view to high-quality index prints, it is a hindrance when using scanning data in determining the correct exposure times. With this amount of data, currently conventional methods used in exposure time calculation, including color and data corrections, cannot be implemented with reasonable effort and expense. For this reason, according to U.S. Pat. No. 5,184,227, when calculating the exposure time, the scanning data of a plurality of scanning regions are combined and reduced to a 24 (vertical)×36 (horizontal) matrix, which is then used to calculate the exposure. It is known that a resolution on this order of magnitude is entirely sufficient for taking all the color information of a photographic original into account in calculating the exposure.

The method described in U.S. Pat. No. 5,184,227, of assessing the color of the original with very high local resolution and then reducing this data set for calculating the exposure, nevertheless also has disadvantages. Because of the high local resolution, the individual scanning regions are very small, and hence the measurement light intensities acting upon each of them are very slight. As a rule, this results in reduced measurement accuracy for the color density, since the signal to noise ratio is markedly poorer than when larger-area scanning regions are used. Still, for the most correct possible exposure calculation it is desirable that the color information be determined in a scanning region with the highest possible accuracy. Typically, in view of the correct exposure calculation, it is more advantageous to analyze the respective original with locally lower resolution which facilitates scanning larger areas resulting in a very high measurement accuracy with respect to the color information, as opposed to using a high local resolution in the scanning and to accept a reduced measurement accuracy with respect to the color information.

For this reason, in many modern photographic printers, when the photographic originals are scanned for their color composition, a low to medium local resolution is used. Typically, 39×26 scanning regions per original are used. The goal is to determine the most accurate color information of these scanning regions. To further increase the accuracy of the color information, it is known that instead of determining the three color densities in the fundamental colors of blue, green and red for each of the scanning regions, a spectral analysis is performed of the measurement light transmitted or remitted from the scanning region. In this method, the measurement light is examined with regard to its intensity, for instance, in 35 different wavelength ranges of the visible spectrum. Thus, instead of only three scanned values per scanning region, 35 scanned values are determined. Such a high spectral resolution per scanning region, in combination with a high local resolution of the color scanner as described above, would lead to data of relatively low accuracy with regard to the color information, and would also produce an amount of data that would be difficult to process at reasonable effort and expense.

On the other hand, local resolution of 39×26 scanning regions per original is normally too low to allow the data to be used directly as a digital representation of the picture content for producing index prints of adequately high quality. Typically, digital representations should have a resolution of at least 190×130 digital pixels, if the individual pictures on the index print are to have a high quality.

SUMMARY OF THE INVENTION

It is therefore an object of the invention to provide a method for producing index prints that makes it possible, with a minimal additional effort and expense, to utilize the data produced in the analysis of photographic originals in a photographic printer, to produce digital representations of the picture contents of the originals. In particular, the method is suitable for photographic printers that use color-sensitive scanning systems with low to medium local resolution to determine the exposure values and generate high-quality index prints.

An exemplary method according to the present invention for producing index prints with a selectable number of small positive images of associated photographic originals includes the following steps:

each of the photographic originals in a scanning station of a photographic printer is scanned photoelectrically by means of a color-sensitive scanning system in a plurality of first scanning regions, and the scanning data obtained is used to ascertain respective light exposure values for producing photographic copies of the originals;

from the scanning data of the color-sensitive scanning system, a digital color data set, including representative color data for each individual first scanning region, for each original is determined;

with the aid of the digital color data set, a digital representation of the picture content of the original is produced for each original; and the digital representations of the individual photographic originals that belong to a selectable number of small images are grouped into a digital composite picture, so that an output device can produce an index print on an output medium.

In an exemplary method according to the invention, a color-sensitive scanning system with low to medium local resolution is used. The photographic originals are photoelectrically scanned in the scanning station in a plurality of second scanning regions by means of a locally high-resolution density scanner. From the scanning data of the density scanner obtained thereby, a digital density data set including density data representative of the original and which has a higher local resolution than the color data set for each original is determined. In producing the digital representation of the picture content of the respective photographic original, both the associated color data set and the associated density data set are used.

By means of the density scanner, for every second scanning region, a neutral density, such as a grey value, is determined, which is representative of the brightness (density) of the respective second scanning region. The density data set includes the entirety of the neutral density data of an original, and represents a locally high-resolution grey-tone image in digital form. This high-resolution grey-tone image is colored, using the locally lower-resolution color data set that belongs to this original, to produce a digital colored representation of the original that can be used to generate index prints. Thus, the provisions according to exemplary embodiments of the invention make it possible, in photographic printers that use color-sensitive scanning systems of low to medium local resolution—such as 39×26 scanning regions per original—to produce digital representations, at very little additional effort and expense, of the picture contents of the originals that have sufficiently high local resolution such as 190×130 pixels per original, and to produce high-quality colored index prints from them. The density information important for detecting the picture content of an original is obtained from the locally high-resolution neutral density values of the density scanner, while the color information that is important for the aesthetic impression is obtained from the locally lower-resolution color data of the color-sensitive scanning system.

For an optimal determination of the exposure values for producing photographic prints from the originals, it is advantageous to carry out the color-sensitive scanning of the originals at a low to medium resolution of, for instance, about 39×26 scanning regions per original. At this resolution, the individual scanning regions are larger and thus a higher measurement accuracy with regard to the color information is attainable. The amount of data produced can be processed at reasonable expense, even if a high spectral resolution of, for instance, 35 wavelength ranges per scanning region is used. The method according to the invention offers the advantage that with the aid of this locally, relatively low-resolution color data, index prints of high quality can be produced without requiring an additional, locally higher-resolution measurement of all the color information of the originals.

In some modern photographic printers, such as the high-speed printers in the known SYNTRA photofinishing system available from Gretag Imaging AG, two measuring systems are also provided for analyzing the photographic originals: one color-sensitive scanning system, with high measurement accuracy for color information and low to medium local resolution, and one density scanner, which furnishes a locally high-resolution gray-tone image of the original, and whose density data are used to evaluate the sharpness of an original. For such printers, the method of the invention is especially advantageous, since both the requisite color data and the requisite density data can be determined by means of the measuring systems that are already present and the measurement data can be furnished by them.

The method of the invention is also advantageous for printers that do not have a high-resolution density scanner. At relatively little expense, it is in fact possible to install an additional scanner, with sufficiently high local resolution in such printers to produce index prints. These printers, currently produce only color data. Nor are such high demands made of this density scanner, in terms of measurement accuracy, as are made of the color-sensitive scanning system, and this is advantageous for the sake of retrofitting with very little expense and effort. With exemplary methods of the invention, it is possible for existing printers, at little expense, to produce index prints, or to furnish the necessary data in digital form for an external device.

Exemplary methods of the invention also can be used for varying the local resolution of the digital representations, or of the individual pictures of the index print, that is, the number of digital pixels per original. For instance, if the density scanner has a higher local resolution than is needed to produce the desired index prints, then in the determination of the density data set, the scanning data from a plurality of second scanning regions obtained by the density scanner are combined. As a result, the local resolution of the density data set is lower than the local resolution of the density scanner and higher than the local resolution of the color data set.

In an exemplary method of the invention, for each photographic original, from the associated color data set a refined color data set for this original is ascertained by determining intermediate values, and this refined set has essentially the same local resolution as the density data set. For producing the digital representation of the picture content of the respective photographic original, both the associated refined color data set and the associated density data set are used.

The intermediate values for producing the refined color data set are each determined by means of an interpolation in which the color data of the intermediate value to be determined are ascertained from the weighted mean value of the color data of the locally immediately adjacent first scanning regions.

It is especially favorable in each case to determine the weight with which the color data of the individually adjacent first scanning regions enter into the interpolation by means of a weighting function that is dependent on two location coordinates, which describe the relative local position of the respective first scanning region with regard to the local position of the intermediate value to be determined.

This weighting function may be selected as the product of two subfunctions, the first subfunction being dependent only on the first location coordinate and the second subfunction being dependent only on the second location coordinate.

A variant of an exemplary embodiment is that the first subfunction is linearly dependent on the first location coordinate, and that the second subfunction is linearly dependent on the second location coordinate.

A further development of an exemplary embodiment is characterized in that for determining the weights with which the respective color data enter into the interpolation to produce the refined color data set, the density data of the associated density data set are taken into account.

To that end, from the density data of the density data set that belong to the second scanning regions, which with respect to their local position are located between the first scanning regions entering into the respective interpolation, the changes in the density data both in a first direction and in a second direction can be ascertained. These changes, and in particular their absolute values or squares, are taken into account in determining the weights with which the respective color data enter into the interpolation to produce the refined color data set.

In the context of exemplary methods of the invention, the scanning data of the color-sensitive scanning system can be subjected to color and/or density corrections, and the corrected data are used for determining the digital color data sets.

It is also possible to adapt the gradation of the individual digital representations or of the digital composite picture to the gradation of the output medium.

To increase the apparent sharpness of the index print, it is advantageous to subject the density data of the density data sets to digital filtration.

The invention will be described in further detail below in conjunction with the drawings, which are schematic and not to scale.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
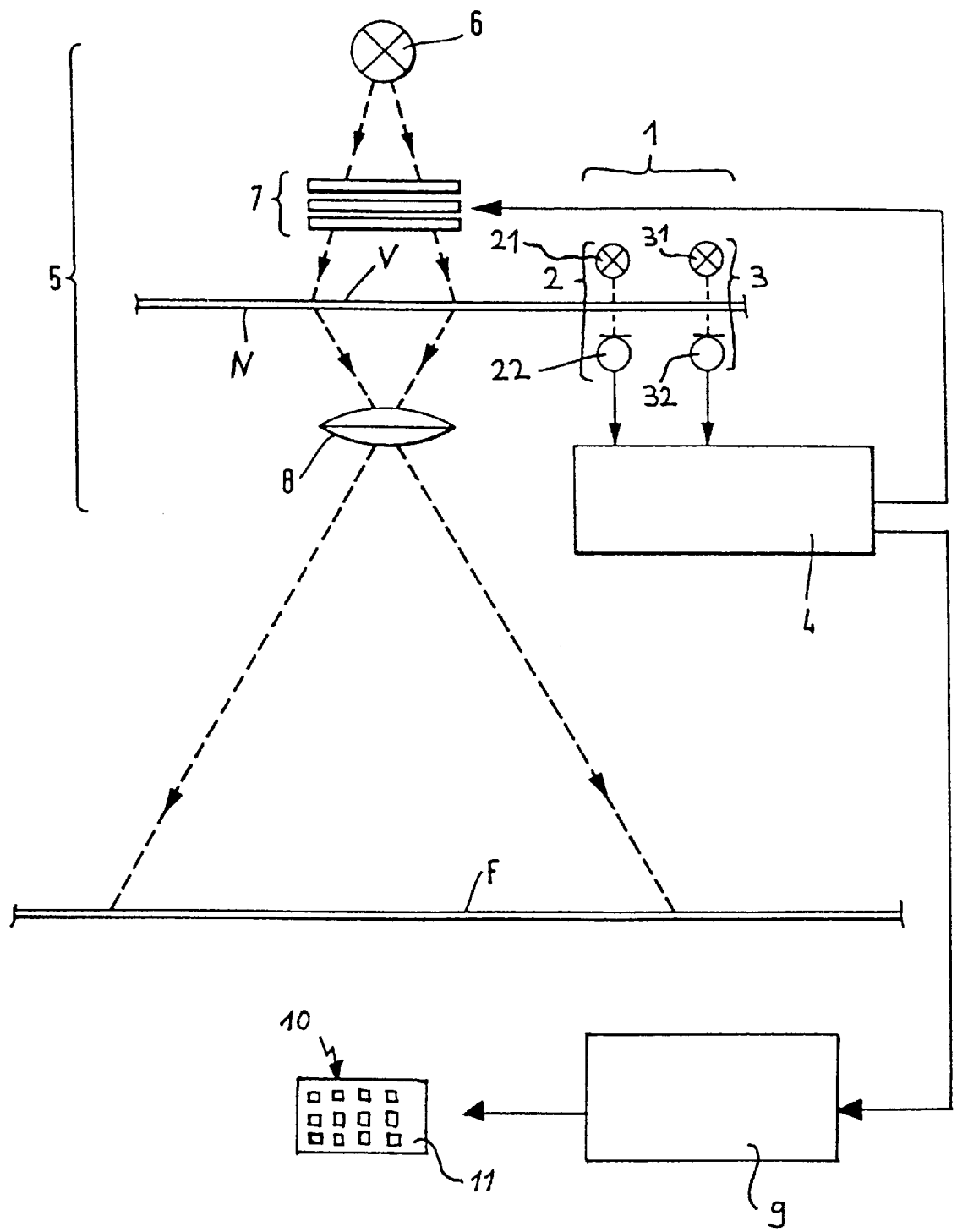
FIG. 1 is an illustration of an exemplary arrangement of parts of a photographic printer.

When photographic copies of photographic originals on film material are made in photographic printers, the originals are typically photoelectrically scanned in a scanning station 1 (FIG. 1) of the printer by means of a color-sensitive scanning system 2 in a plurality of scanning regions. The scanning data obtained is used to ascertain exposure values for each original in producing the photographic copies.

In an exemplary method according to the invention for producing index prints 10 (FIG. 1) (i.e. a selectable, predetermined number of small positive images of associated photographic originals), the scanning data is used for each of the originals to determine a digital color data set which includes representative color data for each first scanning region. These color data are, for instance, a triplet of color values, which represent the color information of the associated first scanning region. With the aid of the digital color data set, a digital representation of the picture content of this original is then determined for each original. The individual digital representations of the individual photographic originals V that belong to the selectable number of small images which are to be shown on the index print 10 to be produced are then grouped into a digital composite picture. By using an output device 9, an index print 10 can be made on an output medium 11. An exemplary method of the invention includes the following method steps:

for the photoelectric scanning of the originals, a color-sensitive scanning system 2 with low to medium local resolution is used. Here, "low to medium local resolution" means that the number of first scanning regions per original is at most on the order of magnitude of $10^3$ or in other words is at most 1000 to 2000. In particular, this applies to the kind of color-sensitive scanning systems that are included in many modern photographic printers and that scan each original with a local resolution of approximately 39×26; that is, the total of 1014 scanning regions per original are disposed locally, with regard to the original, in the form of a matrix with 39 lines and 26 columns;

the photographic originals V are photoelectrically scanned in the scanning station 1 in a plurality of second scanning regions by means of a locally high-resolution density scanner 3. From the scanning data obtained, a digital density data set for each original is determined, which contains density data representative of the original. The term "locally high-resolution" means that the number of second scanning regions per original is greater by about one order of magnitude than the number of the first scanning regions which are represented by a low to medium local resolution. Some known photographic printers are already equipped with such high-resolution density scanners, for assessing the sharpness of an original. They have a local resolution of about 390×260 per original, for example. That is, a total of 101,400 second scanning regions per original are arranged locally with regard to the original in the form of a matrix with 390 lines and 260 columns;

for producing the digital representation of the picture content of the respective original, both the associated color data set and the associated density data set are used.

For the sake of terminological distinction, it should also be noted here that the term "density", as used in conjunction with "density scanner" or "density data", is intended to mean a neutral density that is undifferentiated with respect to color, such as a gray value or in other words a variable that is representative for the brightness (density) of the particular scanned region. The density data set in which all the neutral density data of an original are combined thus represents a locally high-resolution gray-tone image in digital form.

As already noted, some photographic printers known per se already have a color-sensitive scanning system 2 and a high-resolution density scanner 3; in that case, no retrofitting of the printer in this respect in order to determine the scanning data for the color data set and the density data set is necessary. As a result of the method of the invention, such printers are especially simple to use for generating index prints 10 or for furnishing the requisite digital representations of the picture contents. If the printer has only one color-sensitive scanning system 2, then it is possible, with very little effort and expense, to install a high-resolution density scanner 3 as a second scanning system. An advantage here is that, first, such high-resolution density scanners for determining densities that are undifferentiated in terms of color are relatively inexpensive, and second, the existing color-sensitive scanning system can continue to be used in an essentially unaltered manner. Moreover, not such high demands for measurement accuracy have to be made of the density scanner as are made of the color-sensitive scanning system, which is also advantageous in view of the costs for retrofitting the printer with such a density scanner.

For the following description it will therefore be assumed that the photographic printer has both a color-sensitive scanning system of low to medium resolution and a high-resolution density scanner.

Also in the following description, for the sake of simplicity and by way of example, reference will be made to the very frequent situation in the industry that the film material is negative films, on which individual frames are located as photographic originals, and that the photographic copies made of the frames are paper prints. The frames on the negative films are thus a representative example of photographic originals, and the paper prints are a representative example of photographic copies. It will be understood that exemplary methods according to the invention are not limited to this example. For instance, slides can serve as photographic originals, and sheets can serve as photographic copies.

For the sake of better comprehension of the invention, first the general mode of operation of a typical photographic printer, known per se, with which photographic copies of photographic originals can be produced will be explained. In FIG. 1, an arrangement of the essential parts of a photographic printer, which is suitable for the method of the invention, is shown schematically. The photographic printer essentially includes the scanning station 1, which includes the color-sensitive scanning system 2 with a first measurement light source 21 and a first detector array 22 and the density scanner 3 with a second measurement light source 31 and a second detector array 32.

A negative film N that contains the frames V is photoelectrically scanned in the scanning station 1, on the one hand by the color-sensitive scanning system 2 of locally low to medium resolution in a plurality of first scanning regions and on the other is photoelectrically scanned by the high-resolution density scanner 3 in a plurality of second scanning regions. The light transmitted from each first scanning region of the negative film N is decomposed spectrally by the first detector array 22 and converted into wavelength- and intensity-dependent electrical measurement signals.

Next, these electrical measurement signals are digitized and evaluated to ascertain the optimal exposure values for projecting the original V, examples being the quantities of copying light in the colors blue, green and red. This digitizing and evaluation can be done in either the first detector array 22 or a downstream computer and control unit 4. The locally high-resolution scanning data obtained by means of the density scanner 3 are typically used to assess the sharpness of the frame V and are used for instance to determine detail contrasts. Typically, these scanning data are also utilized to determine the exposure values. With the aid of the exposure values specific to the particular original V, the computer and control unit 4 generates control signals, which are used to control color filters 7 provided in the downstream exposure station 5 (naturally, other methods known per se for exposure in the three colors are also suitable).

It is in this exposure station 5 that the actual projection of the respective frame V onto photo paper F takes place. The projection of the frames onto photo paper is done such that the color filters 7 are moved into the beam path of a copying light source 6 in accordance with the control signals generated in the computer and control unit 4. By means of a projecting optical element 8, the corresponding frame V is then projected onto the photo paper F. Next, the exposed photo paper F is developed in a paper processor, not shown. Up to this point, the arrangement shown in FIG. 1 corresponds to the prior art, as described in numerous printed references. Naturally the output device 9 for outputting the index prints 10 on the output medium 11 (such as paper), which is symbolically indicated in FIG. 1, does not necessarily belong to the photographic printer. It can also be an external output device 9.

Methods with which optimal exposure values (copying light quantities) or exposure corrections are determined from the scanning data for the particular original V are described for instance in European Patent Disclosures EP-A 0 360 751, EP-A 0 475 897, and EP-A 0 586 773, the contents of which are hereby incorporated by reference, and will not be described further here. However, it should be noted that some of the transformations, normalizations or corrections of the original scanning data described in further detail below are also performed in the same or logically equivalent way in the context of known exposure calculating methods, so that both the exposure calculation and the production of the digital representations can be performed in a single operation.

The method steps to be performed for producing the digital representations or the digital composite picture, and in particular the calculations described earlier herein, can for instance be performed entirely or in part in the computer and control unit 4 of the printer, which unit then forwards the digital representations or the digital composite picture to the output device 9. Naturally, it is also possible to provide an additional unit, which can be connected to the computer and control unit 4, and into which the output device 9 can be integrated for producing the digital representations or the digital composite picture.

An exemplary method according to the invention for producing index prints 10 is based on the fact that for each of the photographic originals V, both a locally low- to medium- resolution color data set and a locally high-resolution density data set are ascertained. Both of these data sets are then utilized to produce the digital color representations of the picture contents of the originals V, with the density data set being colored by means of the color data set.

For each of the first scanning regions, the color data set includes representative color data. In an exemplary method according to the invention, the color data set has one triplet of color values $k_0$, $k_1$ and $k_2$ for each of the first scanning regions. For the rest of the method it is advantageous if the three color values are in a form in which the color value $k_0$ can be imagined as a "neutral density" on a "density axis", and the other two color values $k_1$, $k_2$ can be imagined as "color coordinates" in a color plane, because in this way it is possible to consider density and color separately. For the explanations that follow, reference will be made to this form of the color data set.

As a rule, it is naturally not the case that the "raw" scanning data determined by the color-sensitive scanning system 2 are directly available for the individual first scanning regions in this kind of form, with one neutral density value $k_0$ and two color coordinates $k_1$, $k_2$ per first scanning region. However, depending on the type of raw scanning data, they can be converted into a desired form by means of a color space transformation adapted to them. It is also often desirable to subject the raw scanning data, determined by the color-sensitive scanning system 2, to a normalization or correction operation. The goal of this normalization or correction is to compensate for color casts dictated by film type, as well as for color casts that can be ascribed to the lighting conditions when the picture was taken, as well as for deviations from an ideal exposure. Such color space transformations, normalizations and corrections of the raw scanning data, which also occur in exposure calculations, can be performed as described in EP-A 0 586 773 or EP-A 0 475 897. They will be sketched here only briefly in terms of two examples.

If the color-sensitive scanning system 2 is a kind that ascertains the color densities in the three colors blue, green and red (b, g, r) as raw scanning data for each first scanning region, then these values b, g, r are compared with reference densities (see for example EP-A 0 475 897), which can be considered a "norm" for the color densities of an original V. From this, corrections b', g', r' or b—b', g—g', r—r', respectively, are ascertained, which describe the deviations from this norm. By means of a color space transformation, in accordance with the following equation, $$\begin{pmatrix} k_1 \\ k_2 \\ k_0 \end{pmatrix} = \begin{pmatrix} 0 & \cos(30°) & -\cos(30°) \\ 1 & -0.5 & -0.5 \\ 0.1 & 0.6 & 0.3 \end{pmatrix} \cdot \begin{pmatrix} b-b' \\ g-g' \\ r-r' \end{pmatrix}$$

the three color values $k_0$, $k_1$, $k_2$ are then ascertained. That is, $k_0$ represents the neutral density value, while $k_1$ and $k_2$ represent two color coordinates. Because of the normalization, the origin of the new coordinate system corresponds to a neutral gray of normal or average density.

In the second example, the color-sensitive scanning system 2 is the kind with which, as already noted above, a spectral analysis of the measurement light transmitted or remitted from the respective first scanning region is performed. The measurement light is investigated as to its intensity in n different wavelength ranges of the visible spectrum. For instance, the measurement light is analyzed in n=35 wavelength ranges, which represents a markedly higher spectral resolution per first scanning region than the determination of the three color densities in the colors blue, green, red. Hence per first scanning region, n spectral measurement signals are ascertained which correspond to the transmission or remission of the original in this first scanning region for the various wavelength ranges. These spectral measurement values are converted by logarithmizing into n spectral density values and compared with corresponding reference densities, such as a neutral gray standard original (see EP-A 0 475 897). This is followed by data compression by means of a transformation, such as the Karhune-Loève transformation. From the transformation coefficients obtained, by certain criteria (as described in EP-A 0 475 897), a number of transformation coefficients are selected that with high accuracy are representative for the spectral density distribution of the first scanning region being observed. In particular, three transformation coefficients can be selected which have approximately the above-described form; that is, one of the coefficients can be a neutral density value $k_0$ and the other two can be color coordinates $k_1$, $k_2$.

Alternatively, as described in EP-A 0 586 773, the comparison of the n spectral density values with the corresponding reference densities can be omitted, and the n spectral density values can be subjected to the Karhune-Loève transformation directly. The three selected transformation coefficients can then be subjected to a normalization operation.

With the method briefly sketched above, from the "raw" scanning data of the locally low- to medium-resolution color-sensitive scanning system 2, one digital color data set can be prepared for each original V that includes, for each first scanning region, a triplet of (normalized) color values $k_0$, $k_1$, $k_2$, where $k_0$ represents a neutral density value and $k_1$, $k_2$ represent two color coordinates.

The scanning data of the high-resolution density scanner 3 are also transformed or normalized in such a way that they are maximally approximated to the neutral density value $k_0$ of the color data set. By means of the locally high-resolution density scanner 3, for instance a color- undifferentiated neutral density value is determined for every second scanning region and is representative of the brightness (density) of the respective second scanning region. The density data set to be produced need not necessarily have the same local resolution as is attainable with the density scanner. For instance, it is possible to reduce the local resolution of the density data set relative to the maximum local resolution of the density scanner 3, by combining a plurality of second scanning regions into one original region in determining the density data set, and combining the neutral density values from these second scanning regions into a new neutral density value $k_d$ for this original region. The density data set then has a local resolution that, on one hand, is less than the local resolution of the density scanner and, on the other, is greater than the local resolution of the color data set. In addition, the density data set for each original region contains a neutral density value $k_d$ representing the brightness of that region.

For the sake of simplicity, and because it is entirely sufficient for comprehension, no distinction will therefore be made below between original regions and second scanning regions. However, it will be understood that the original regions are identical with the second scanning regions, if the combining of second scanning regions is omitted.

Because of the higher local resolution of the density data set, there will always be original regions of the kind that locally, with respect to the original V, are included in a first scanning region, or overlap with such a scanning region or at least are in the immediate vicinity of such a scanning region. By comparing the neutral density values $k_d$ of such original regions with the neutral density values $k_0$ of the corresponding first scanning regions, the neutral density values $k_d$ can be used, by means of transformation or a normalization, to ascertain new neutral density values $k_d'$, which are maximally adapted to the neutral density values $k_0$ of the color data set.

For producing the colored digital representation of the picture content of an original V, the locally high-resolution neutral density values $k_d'$ of the density data set, which furnish the information on the picture content, and the color coordinates $k_1$, $k_2$ of the color data set that furnish the color information and determine the aesthetic appearance of the small image in the index print, are then used.

In an exemplary method of the invention, for each photographic original V, a refined color data set is ascertained from the associated color data set by means of determination of intermediate values; this refined color data set has substantially the same local resolution as the density data set. The intermediate values are each determined by means of an interpolation, in which the color data of the intermediate value to be determined are ascertained from the weighted mean value of the color data of the locally immediately adjacent scanning regions. Hereinafter it will be explained in conjunction with FIG. 2 how one can proceed, for instance to determine the refined color data set for a given original V. As a concrete numerical example, the following local resolutions can be considered (each given in the form of a×b, where a indicates the number of lines in the matrixlike arrangement of scanning regions, or the pixels of the digital representation, and b indicates the number of columns): The color-sensitive scanning system 2 (FIG. 1), and thus the color data set, has a local resolution of approximately 39×26 per original, the density scanner 3 has a maximum local resolution of about 390×260 per original, and the digital representations should have a local resolution each of about 190×130 pixels. Using the above-described compilation of second scanning data into original regions and transformation or normalization of the neutral density values $k_d$ for the given original V, the density data set with the neutral densities $k_d'$, which has a local resolution of 190×130, is ascertained.

Figure 2:
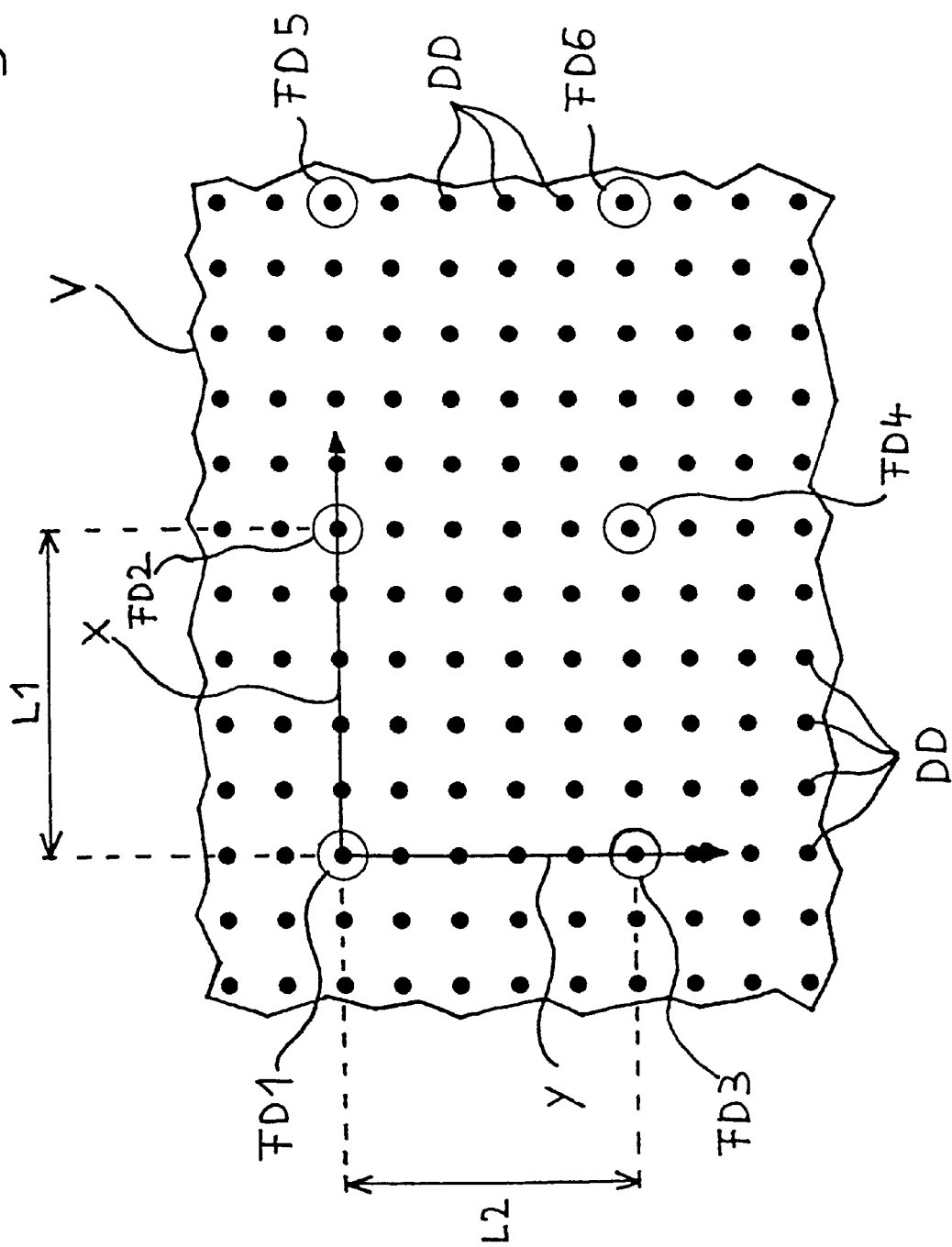
FIG. 2 is an illustration of a detail of a photographic original, to assist in explaining a procedure for ascertaining a refined color data set.

FIG. 2 in a symbolic illustration, shows a detail of the given original V for which the refined color data set is to be prepared. The local position of the individual original regions is represented by the smaller circles with the reference symbol DD; the local position of the first scanning regions, that is, the local position of the individual color value triplets of the color data set, is represented by the larger circles with reference symbols FD1–FD6. This symbolic illustration is somewhat simplified, for the sake of better clarity, and needs some further prior explanation. In practice, the individual first scanning regions or original regions are substantially closer together, but showing that would lead to problems in the drawing. The drawn-in circles DD and FD1–FD6 are therefore to be understood symbolically, for instance as the center point of the respective original region or first scanning region. In order to indicate the fact that the first scanning regions as a rule are larger than the original regions, the larger circles FD1–FD6 had been chosen to show the first scanning regions. In reality, the first scanning regions need not contain an original region either; the grid formed of the first scanning regions can certainly be locally shifted relative to the grid formed by the original regions. Moreover, the ratio of the two grids need not necessarily be integral. In addition, the spacing L1 between two first scanning regions (such as FD1 and FD2) next to one another in the first spatial direction need not necessarily be equal to the spacing L2 between two first scanning regions (such as FD1 and FD3) adjacent to one another in the second spatial direction. Nevertheless, all of these factors are not essential to comprehension, and the simplified case shown in FIG. 2 will therefore be referred to below.

Since the relative local arrangement of the color-sensitive scanning system 2 and the density scanner 3 in the scanning station I is known and the feeding speed of the original in the scanning station 1 is known or can be ascertained, the relative local association of the color data and the density data is generally easy to achieve.

The goal in determining the refined color data set is now, from the known color data of the color data set for all the circles DD (which symbolize the original regions, for each of which the associated neutral density values $k_d'$ are of course known), to determine the respective color data and in particular, the two color coordinates $k_1$ and $k_2$ by means of intermediate value determination. This is for instance done as follows:

In FIG. 2, the four circles FD1–FD4 form an interpolation square. The calculation of the color coordinates $k_1$ and $k_2$ for all the circles DD that are located inside this interpolation square or on its sides is done in each case by forming a weighted average of the color coordinates $k_1$ and $k_2$ that belong to the four circles FD1–FD4; that is, the color coordinates to be interpolated are each calculated in accordance with a relationship of the following form:

$$k_j = \frac{\sum_{i=1}^{4} w(i) \cdot k_j(i)}{\sum_{i=1}^{4} w(i)} \quad j=1, 2; i=1, 2, 3, 4$$

In it, $k_j$ (j=1 or j=2) designates the color coordinate to be interpolated; $k_j(i)$ designates the color coordinate $k_j$ (j=1 or j=2) that belongs to the circle FDi (i=1, 2, 3, 4), and w(i) represents the respective weight with which the color coordinates of the circle FDi enter into the interpolation.

For determining the weights w(i), there are various possibilities, some of which will be explained below. For reasons of symmetry, however, it suffices for comprehension purposes to explain how the weight w(i) is determined for one of the four circles FD1–FD4 involved in the respective interpolation. The following explanation will therefore address only the determination of the weight W1 of the color coordinates belonging to the circle FD1. The determination of the weights w(i) (i=2, 3, 4) for the color coordinates of the other three circles FD2–FD4 is done analogously. Since the suffix i is no longer necessary, it will be omitted below.

First, as shown in FIG. 2, a coordinate system is defined, with two coordinate axes x and y, whose origin (always x=0, y=0) is located in the center of the circle FD1. The coordinate axis x extends in the direction of the adjacent circle FD2, and the coordinate axis y extends at right angles to it, in the direction of the adjacent circle FD3. Thus, the relative position of each circle DD of the interpolation square—and hence the local position of each intermediate value to be determined—can be described with reference to the center of the circles FD1 by the two location coordinates x and y. The weight with which the color coordinates $k_1$ and $k_2$, which belong to the circle FD1, each enter into the interpolation can then be determined for all the color coordinates to be interpolated, at the locations of the circles DD of the interpolation square, by means of a weighting function (w(x,y)), which is dependent on the two location coordinates x and y. The weighting function w(x,y) is preferably selected such that it has the following properties:

the weighting function has its maximum at the center of the circle FD1 (x=0, y=0). This maximum is normalized to the value of 1, for instance;

for a constant location coordinate y, the weighting function decreases monotonically with an increasing location coordinate x;

for a constant location coordinate x, the weighting function decreases monotonically with an increasing location coordinate y;

in the center of the other three circles FD2, FD3, FD4, which form the other corners of the interpolation square, each weighting function has the value of 0; that is: w(L1,0)=0; w(0,L2)=0; w(L1,L2)=0.

The weighting function w(x,y) can for instance be selected as the product of two subfunctions u(x,0) and v(0,y); that is, w(x,y)=u(x,0)•v(0,y); the first subfunction u(x,0) is dependent only on the location coordinate x, and the second subfunction v(0,y) is dependent only on the location coordinate y.

An especially simple variant takes advantage of the fact that the interpolation is linear. The two subfunctions u(x,0) and v(0,y) are then each linear in the respective location coordinate x and y on which they depend. Concretely, the two subfunctions take the following form, for example:

$$u(x, 0) = 1 - \frac{x}{L1}, v(0, y) = 1 - \frac{y}{L2}$$

The weight w, with which the color coordinates that belong to the circle FD1 enter into the calculation of an intermediate value, whose local position in the interpolation square is defined by the location coordinates x and y, where $0 \leq x \leq L1$ and $0 \leq y \leq L2$, can accordingly be calculated from the equation w(x,y)=u(x,0)•v(0,y).

In an analogous way, the three weights with which the color coordinates that belong to the circles FD2, FD3, FD4 each enter into the interpolation are also calculated. Thus, for all the original regions (represented by the circles DD in FIG. 2) which are located inside or on the sides of the interpolation square FD1, FD2, FD3, FD4, the respective color coordinates $k_1$, $k_2$ can be determined.

These interpolations are performed in a similar manner in other interpolation squares as well; for example, those that are formed by the four circles FD2, FD5, FD4, FD6. It is clear that with this procedure, for each original region (symbolically represented by the circles DD) of the original, the associated color coordinates $k_1$ and $k_2$ can be obtained by interpolation. The entirety of this color information then forms the refined color data set, which has the same local resolution as the density data set, that is, in the concrete example mentioned, 190×130. The digital representation of the picture content of the original is introduced by combining the respective color coordinates $k_1$ and $k_2$ of the refined color data set with the associated neutral density value $k_d'$ of the density data set. For each pixel of the digital representation (in the concrete example, there are 190×130 pixels per digital representation), the three values $k_1$, $k_2$, $k_d'$ are thus known. The digital representations must also, depending on the output device 9 (FIG. 1) for the index print 10, be put into a data format that can be processed by the output device 9 used. Thus can be accomplished by means of a conversion (i.e. a color space transformation).

A further development of an exemplary embodiment, in which a refined color data set is ascertained for each original by means of intermediate value determination, is that for determining the weights with which the respective color coordinates of the color data set enter into the interpolation, the density data of the associated density data set are taken into account. This means, for instance, that the neutral density values $k_d'$ of the density data set enter into the weighting function w(x,y). This further development is advantageous, particularly, whenever the picture content of the original V has sharp edges at which major color differences occur. When the above-described linear interpolation is employed, it can happen that such sharp edges with major color differences are reproduced in smeared form in the digital representation and also appear smeared on the small positive colored index print image. Such effects can be greatly reduced if the picture information contained in the high-resolution density data set is used in the interpolation of the color data. As a rule, the interpolation then is no longer linear.

For example, the density data which are located within the lower-resolution color data (that is, inside an interpolation square, for instance), can be analyzed for whether a sharp edge is present in the picture content, or not. If so, and if this edge exceeds a predetermined steepness, then the weighting function can be embodied such that up to the local position of the edge, essentially the same color coordinates that belong to the locally adjacent color data of the color data set are used as color coordinates for the intermediate values, and any change in the color coordinates takes place only essentially at the local position of the detected edge.

An especially well-suited procedure for adapting the interpolation to the local course of the density data or to the change in the course of the density data is as follows:

As in the above-described linear interpolation, the color coordinates $k_1$ and $k_2$ of an intermediate value again appear in the form of a weighted mean value of the color coordinates $k_1$ and $k_2$, which belong to the corners of the interpolation square inside which or on whose sides the intermediate value to be interpolated is located. For the following discussion, once again the interpolation square FD1, FD2, FD3, FD4 (FIG. 2) with the two coordinate axes x and y, as already described earlier herein, will be considered. For the same reasons as above, once again it will merely be explained here, without restriction to the general scope, how the weight or the weighting function w(x,y) for the circle FD1 is determined.

The weighting function is again chosen, similar to the linear interpolation, as the product of two subfunctions u(x,0) and v(0,y); that is, w(x,y)=u(x,0)•v(0,y); the first subfunction u(x,0) is dependent on the location coordinate x, and the second subfunction v(0,y) is dependent on the location coordinate y. The essential distinction from the linear interpolation is that the subfunctions u(x,0) and v(0,y) are no longer dependent only on the local position of the intermediate value to be determined, but instead that they are determined for instance as follows from the local course of the density data: First, from the neutral density values $k_d'$ that belong to the original regions (circles DD) that are located on the sides FD1–FD2 and FD1–FD3 of the interpolation square FD1, FD2, FD3, FD4 (or in other words in FIG. 2 on the coordinate axes and between the corners of the interpolation square), two density functions e(x,0) and f(0,y) are determined, which describe the course of the density data on the x coordinate axis and the y coordinate axis, respectively. The density functions e(x,0), f(0,y) may in practice be either discrete functions or continuous ones, for instance interpolation polynomials ascertained from the neutral density values $k_d'$. For the sake of simplicity, the following discussion will therefore use the usual mathematical nomenclature and notation for continuous functions.

As the next step, two functions $s_x(x)$ and $s_y(y)$ are determined, which describe the quantitative derivations of the two density functions e(x,0) and f(0,y), respectively. Accordingly:

$$s_x(x) = \left|\frac{\partial}{\partial x} e(x, 0)\right|, s_y(y) = \left|\frac{\partial}{\partial y} f(0, y)\right|$$

With the functions $s_x(x)$ and $s_y(y)$, the quantitative course of the change in the density data in the two directions of the coordinate axes x and y is thus known.

The two subfunctions u(x,0) and v(0,y) of the weighting function w(x,y) are then obtained by integration of the functions $s_x(x)$ and $s_y(y)$ along the respective coordinate axes and by normalization. Accordingly:

$$u(x,0) = 1 - \frac{\int_0^x s_x(\xi)d\xi}{\int_0^{L1} s_x(\xi)d\xi}, \quad v(0,y) = 1 - \frac{\int_0^y s_y(\zeta)d\zeta}{\int_0^{L2} s_y(\zeta)d\zeta}$$

in which $\xi$ and $\zeta$ designate the integration variables.

These two subfunctions $u(x,0)$ and $v(0,y)$ of the weighting function likewise have the properties that they decrease monotonically in x and y, respectively, that they have their maximum at x=0 and y=0, respectively, that their maximum value is 1, and that where x=L1 and y=L2, respectively, they assume the value of 0.

The weight w, with which the color coordinates that belong to the circle FD1 enter into the calculation of an intermediate value, whose local position in the interpolation square is defined by the location coordinates x and y, where $0 \leq x \leq L1$ and $0 \leq y \leq L2$, can accordingly be calculated from the equation $w(x,y)=u(x,0) \cdot v(0,y)$.

In an analogous way, the three weights with which the color coordinates that belong to the circles FD2, FD3, FD4 each enter into the interpolation are also calculated. Thus for all the original regions (represented by the circles DD in FIG. 2) which are located inside or on the sides of the interpolation square FD1, FD2, FD3, FD4, the respective color coordinates $k_1$, $k_2$ can be determined. These interpolations are performed analogously in other interpolation squares as well, so that for each original region (symbolically represented by the circles DD) of the entire original V, the associated color coordinates $k_1$, and $k_2$ can be obtained by interpolation. The entirety of this color information then forms the refined color data set, which has the same local resolution as the density data set.

Figure 3:
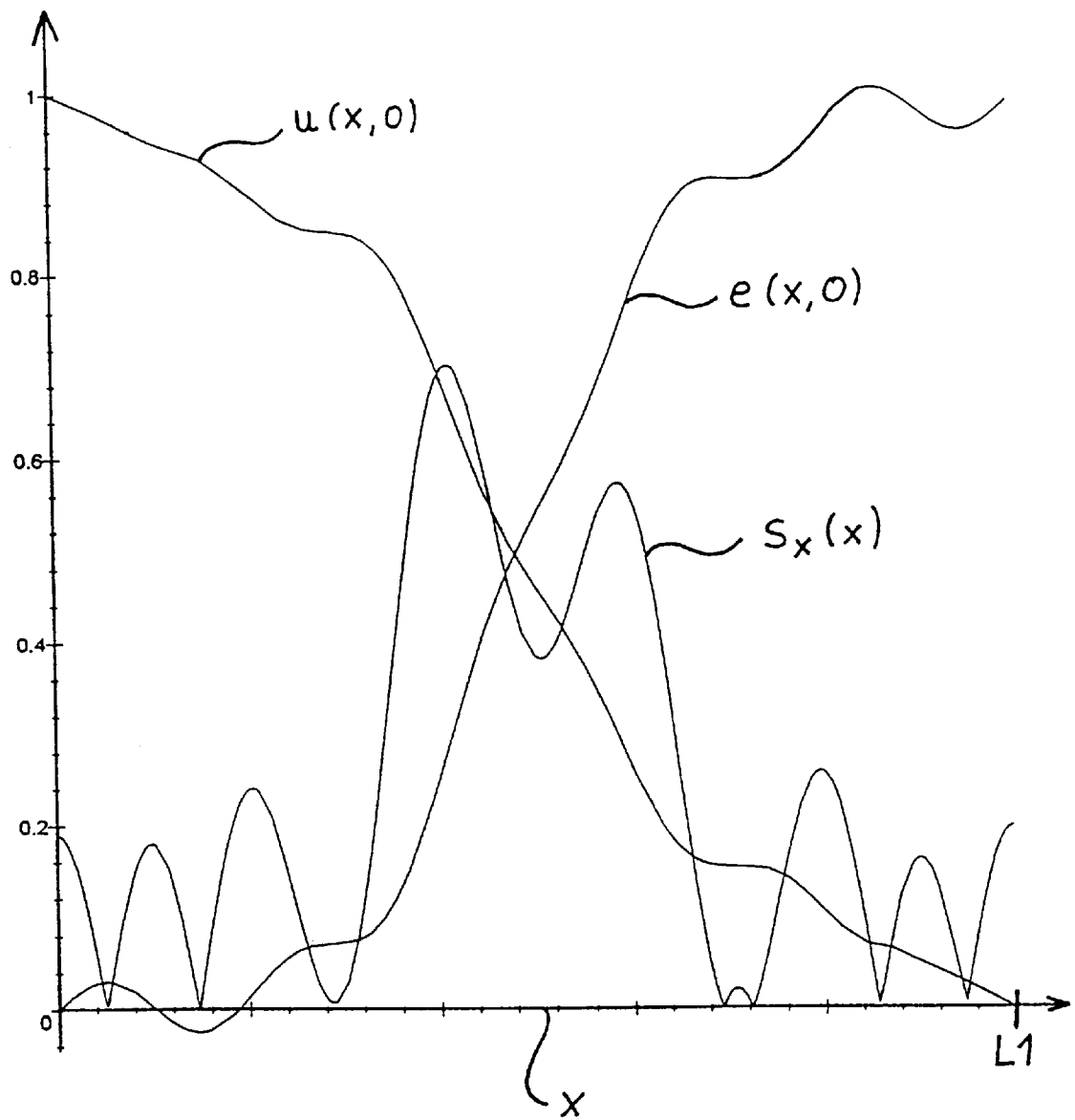
FIG. 3 is a graph in which a density function, the quantitative derivation of this density function, and a subfunction of a weighting function are plotted, each as a function of a location coordinate.

In FIG. 3, for purposes of illustration, one possible density function $e(x,0)$, which describes the course of the density data on the coordinate axis x, is shown in graph form. The fact that the density function dependent on the location coordinate x is shown is not of particular significance; the density function dependent on the location coordinate y could equally well have been shown. Also shown is the course of the function $s_x(x)$ that belongs to $e(x,0)$ and describes the quantitative derivation of $e(x,0)$, and the resultant subfunction $u(x,0)$ of the weighting function for the direction of the coordinate axis x. The location coordinate x is plotted on the abscissa of the graph in FIG. 3, and the values of the subfunction $u(x,0)$, normalized to one, of the weighting function are plotted on the ordinate. For the sake of simplicity, all three functions are represented as continuous functions.

It can be seen clearly from FIG. 3 that the subfunction $u(x,0)$ of the weighting function has its greatest changes where the greatest changes in the density function $e(x,0)$ occur. Translated into the language of color, this means that the color transitions (major change in the subfunction $u(x,0)$ of the weighting function) are concentrated in those regions of the image where the high-resolution density data change the most. This is true, for instance, at edges in the picture content of the original. FIG. 3 thus demonstrates that the above-described smearing at the edges, for instance, can at least be greatly reduced by providing that the picture information contained in the high-resolution density data set be used in determining the refined color data set.

As already noted, it may be advantageous in practice for the density functions $e(x,0)$ and $f(0,y)$ to be discrete. The aforementioned calculations are then carried out in a logically equivalent way, using the methods, known per se, of discrete integration or differentiation.

It is also possible (see above) for the local grid of the density data to be shifted relative to the local grid of the color data, so that there possibly may not be any original regions (circles DD, FIG. 2) located on the connecting line between the circles FD1 and FD2, for instance. In such a case, to determine the density functions, the neutral density values $k_d'$ of those original regions that are located closest to this connecting line will be used.

For example, it is also possible in calculating the functions $s_x(x)$ and $s_y(y)$ to dispense with the absolute value formation and instead to perform a squaring operation; that is, in that case the functions $s_x(x)$ and $s_y(y)$ are the square of the derivative of the respective density functions $e(x,0)$ and $f(0,y)$.

It is also possible to subject the density functions $e(x,0)$, $f(0,y)$ and/or the functions $s_x(x)$, $s_y(y)$ and/or the subfunctions $u(x,0)$, $v(0,y)$ of the weighting functions to smoothing or filtration, in order to reduce interference factors.

It is also possible to select a different form for the weighting function $w(x,y)$ than the product of the two subfunctions $u(x,0)$ and $v(0,y)$. This selection can be made in order to use still more information from the locally high-resolution density data set. One possible weighting function which takes even greater account of the information with regard to the picture content is as follows:

$$w(x,y) = 1 - \frac{\int_0^x \int_0^y \left\{ \left| \frac{\partial}{\partial \xi} e(\xi,\zeta) \right| + \left| \frac{\partial}{\partial \zeta} e(\xi,\zeta) \right| \right\} d\xi d\zeta}{\int_0^{L1} \int_0^{L2} \left\{ \left| \frac{\partial}{\partial \xi} e(\xi,\zeta) \right| + \left| \frac{\partial}{\partial \zeta} e(\xi,\zeta) \right| \right\} d\xi d\zeta}$$

in which the function e is a two-dimensional discrete or continuous density function, that describes the course of the density data in the interpolation square, and once again, $\xi$ and $\zeta$ are integration variables.

Now that the digital representation for the original has been prepared, as described above, by means of the refined color data set and the density data set, and the complete picture information with regard to content and color of the original V is thus available in digital form, the digital representation still have to be put into a data format that can be processed by the output device 9 (FIG. 1) used. For instance, if the output device 9 can be process blue, green and red data, then the $k_d'$, $k_1$, $k_2$ values included in the digital representation are transformed by a color space transformation, using a matrix that is inverse to that used in equation (I). If the output device 9 requires the digital representations to be in some other data form, then it is generally no problem to convert the digital representations into this required data format using an appropriate transformation process. Naturally, in such transformation processes, or color space transformations, the aforementioned normalizations or corrections, which had been performed on the raw scanning data, for instance to compensate for film-type-dictated color casts or to compensate for deviations from an ideal exposure, no longer need to be undone.

It is understood that the digital representations of the picture contents of the originals V can be subjected to still other processing steps, which are typically employed in digital picture processing and are known per se.

For example, the digital representations or the digital composite picture can be further processed using PhotoShop, the picture processing program made by Adobe (Mountain View, Calif., USA).

In particular, depending on the output medium 11 (FIG. 1) or output device 9, the following provisions can be carried out to improve the visual appearance of the index print:

The gradation and range of contrast of the individual digital representations or of the digital composite picture are adapted to the gradation of the output medium 11. This is achieved, for instance, by means of suitable transfer curves (gradation curves) in the three color channels of blue, green and red.

The density data of the density data sets are subjected to a digital filtration, such as a slight high-pass filtration, to increase the apparent sharpness of the index print 10.

The color saturation is adapted, for instance by shrinking or expanding the color plane of the transformed and normalized color space.

Individual digital representations, after being converted, that belong to the selectable number of originals of which small positive images are to be provided on the index print 10, are combined electronically in a known manner to form a digital composite picture. This digital composite picture can naturally include still other information that is typically provided on index prints 10, such as frame numbers, individual frame information, job- specific data (such as film identification number), company logo, variable data (such as the date), etc. From the digital composite picture, an index print 10 is then created on an output medium 11 by means of the output device 9. Suitable examples of output devices 9 are cathode ray tubes (CRT printers), color monitors, thermal (sublimation) printers, laser printers, or ink jet printers. The output medium 11 can for instance be photo paper, some other form of paper, sheet material, or a color monitor. Naturally it is also possible for the digital representations or the digital composite picture to be stored in memory on a data medium, such as a diskette or a photo CD, and from there to make the index print 10 visible as needed on a color monitor.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for producing index prints having a selectable number of small positive images from photographic originals having picture content wherein said method comprises the steps of:
    (a) photoelectrically scanning each of the photographic originals in a scanning station of a photographic printer using both:
        (i) a color-sensitive scanning system with low to medium local resolution, in a plurality of first scanning regions to obtain a first scanning data and;
        (ii) a locally high-resolution density scanner in a plurality of second scanning regions to obtain a second scanning data; wherein said first plurality of scanning regions and said second plurality of scanning regions correspond to the same regions of the photographic original
    (b) using the first scanning data to ascertain respective light exposure values for producing photographic copies of the originals and determining a digital color data set for each original wherein said data set includes representative color data for each of said plurality of first scanning regions;
    (c) determining a digital density data set for each original using the second scanning data, said density data set including density data representative of the original and having a higher local resolution than the color data set;
    (d) producing a digital representation of the picture content of each of said originals from the digital color data set and the digital density data set; and
    (e) grouping into a digital composite picture the digital representations of said originals that belong to a selectable number of small images such that an index print can be made on an output medium.

2. The method of claim 1 wherein the second scanning data from the plurality of second scanning regions is combined in determining the density data set such that the local resolution of the density data set is lower than the local resolution of the density scanner.

3. The method of claim 1 wherein the scanning data of the color-sensitive scanning system are subjected to color and density correction, the corrected data being used in determining the digital color data sets.

4. The method of claim 1 wherein the gradation of the individual digital representations is adapted to the gradation of the output medium.

5. The method of claim 1 wherein the gradation of the digital composite picture is adapted to the gradation of the output medium.

6. The method of claim 1 wherein the density data of the density data sets are subjected to digital filtration to increase sharpness of the index print.

7. The method of claim 1 wherein both the first and second scanning regions correspond to the same picture content.

8. The method of claim 1 wherein each of said photographic copies have a higher resolution than a corresponding small image, the photographic copies and the corresponding small images representing the same picture content.

9. The method of claim 1 wherein photographic copies of said originals are produced by projecting the originals optically on photo paper.

10. The method of claim 1 wherein a refined color data set, associated with the color data set, for each of said originals is ascertained by determining a set of intermediate values such that the refined color data set has the same local resolution as the density data set and wherein the refined color data set and the density data set are used for producing the digital representations of the picture content of the original.

11. The method of claim 10 wherein each of the intermediate values is determined by an interpolation in which the color data of the intermediate value is ascertained from a weighted mean value of the color data of an immediately adjacent first scanning region.

12. The method of claim 11 wherein the weight with which the color data of the immediately adjacent first scanning region enters in the interpolation is determined by a weighting function that is dependent on two location coordinates that describe the relative local position of the first scanning region with respect to the local position of the intermediate value to be determined.

13. The method of claim 12 wherein the weighting function is a product of two subfunctions with a first of said two subfunctions being dependent solely on the first of the location coordinates and a second of said two subfunctions being dependent solely on the second of the location coordinates.

14. The method of claim 13 wherein the first subfunction is linearly dependent on the first location coordinate and the second subfunction is linearly dependent on the second location coordinate.

15. The method of claim 11 wherein the weights with which the color data enters into the interpolation to produce the refined color data set are determined using the density data of the associated density data set.

16. The method of claim 15 wherein the weights with which the color data enters into the interpolation to produce the refined color data set are determined using changes in the density data in a first and a second direction as well as a square of these changes, the density data of the density data set that belong to the second scanning regions being located between the first scanning regions entering into the interpolation.

* * * * *